Aug. 21, 1951  W. R. WICKERHAM ET AL  2,565,157
POLYPHASE INDUCTION MOTOR CONTROL
Filed Dec. 14, 1946  2 Sheets-Sheet 1

WITNESSES:

INVENTORS
William R. Wickerham
and Curt M. Avery.
BY
ATTORNEY

Patented Aug. 21, 1951

2,565,157

UNITED STATES PATENT OFFICE 2,565,157

POLYPHASE INDUCTION MOTOR CONTROL

William R. Wickerham and Curt M. Avery, Pittsburgh, Pa., assignors to Westinghouse Electric Corporation, East Pittsburgh, Pa., a corporation of Pennsylvania Application December 14, 1946, Serial No. 716,300

9 Claims. (Cl. 318—202)

This invention relates to control systems for alternating current motors in which a controlled degree of asymmetry or unbalance is imparted to the phase distribution of the multiphase energization of the motor in order to obtain a desired motor performance. Control systems of this general type are known, for instance, from Patents 2,386,580; 2,386,581; 2,384,864 and 2,384,865 of W. R. Wickerham, all assigned to the assignee of the present patent.

It is a general object of the present invention to provide control systems of the above-mentioned type that are distinguished by a low time constant of control performance so that the motor follows rapidly any change in the governing control stimulus.

According to the copending application of W. R. Wickerham, Serial No. 701,754, filed October 7, 1946, a high speed of response can be obtained by the arrangement of electronic discharge tubes which are plate-connected in the energizing circuit of the motor and operate substantially as controllable impedance devices. In contrast to the provision of such electronic tubes in the motor circuit proper, the present invention has the further object to provide an electronic motor control system capable of similar performance that does not necessitate the connection of discharge tubes in the motor load circuit thus permitting the use of smaller tubes and simplifying the auxiliary circuits and accessories usually required for tubes of higher current-carrying capacity. In conjunction therewith, the invention aims at devising an electronic motor control system that requires a relatively small number of tubes and appertaining control elements, but permits a continuous and gradual control over a wide range of speed and torque magnitudes so that the system lends itself readily for diversified applications, for instance, in hoist controls, drives for draw bridges, reversible drives for machine tools and other fabricating machinery.

These and other objects as well as the means provided by the invention for achieving them, will be apparent from the embodiments exemplified by the drawings and described hereinafter.

Figure 1:
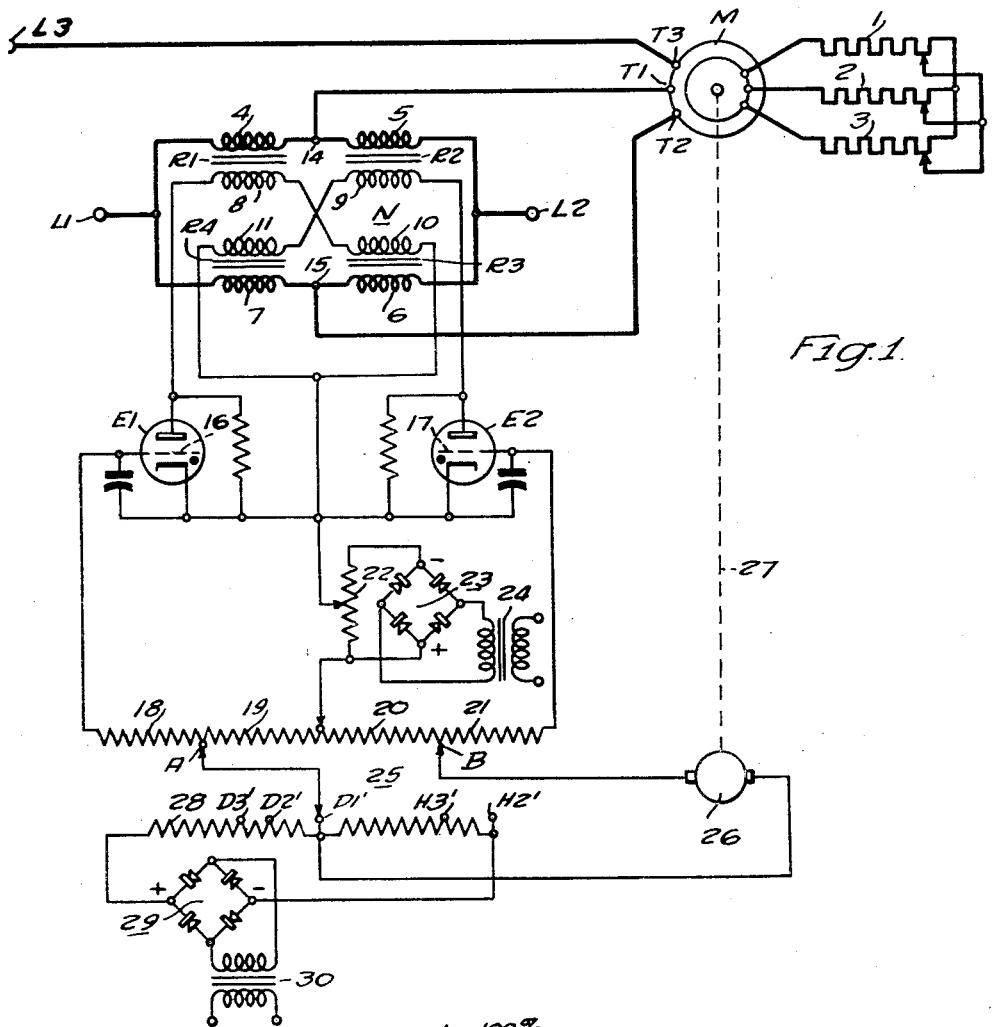
Figure 3:
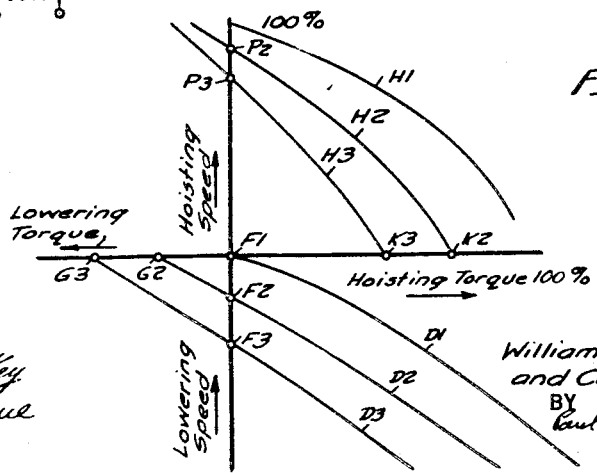
Figure 2:
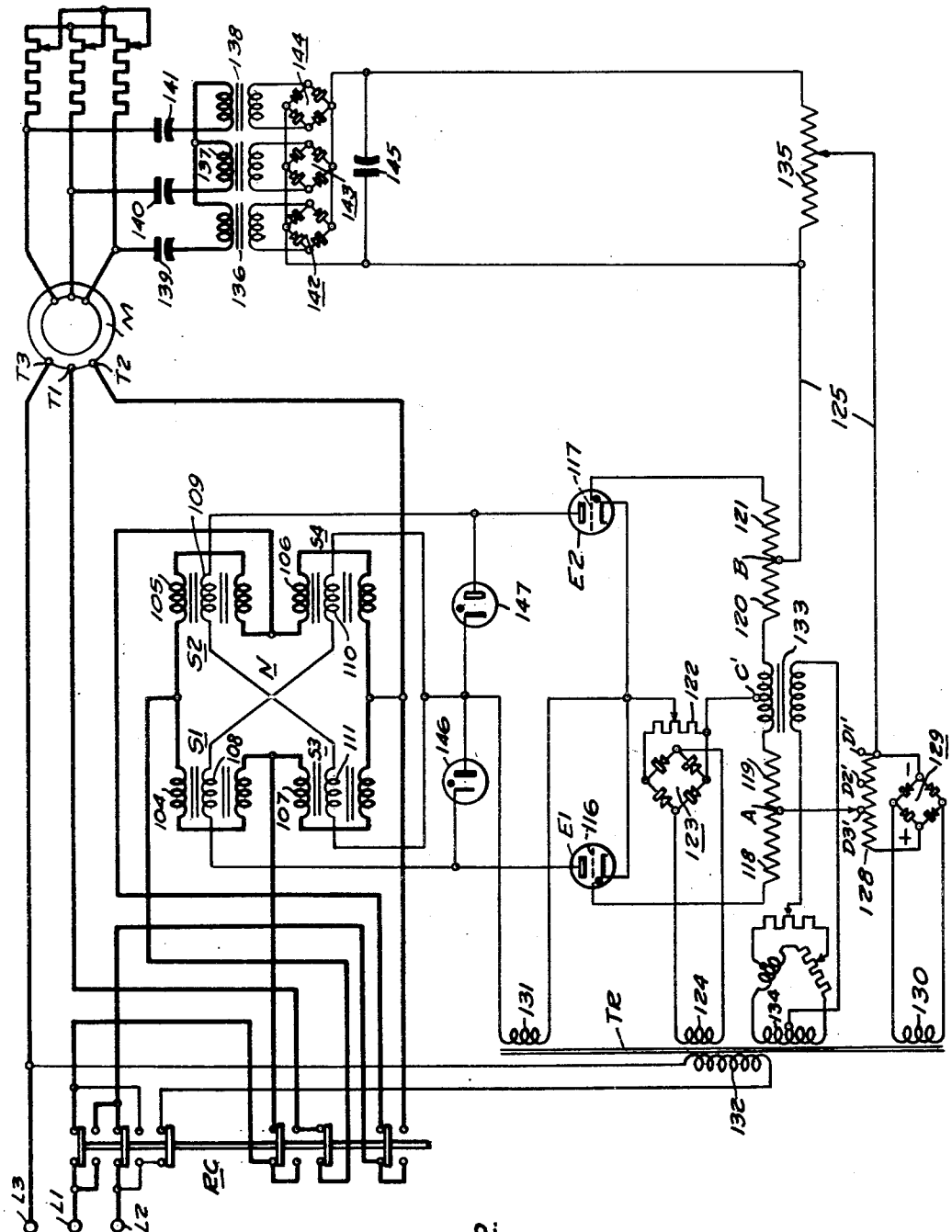

Figures 1 and 2 of the drawings represent the circuit diagrams of two different motor control systems according to the invention, and Fig. 3 represents a speed-torque diagram obtainable with systems according to Figs. 1 and 2, with particular reference to the operation of a hoist control system.

According to Fig. 1, an alternating current motor M of the wound rotor type has its primary terminals T1, T2 and T3 connected to the line terminals L1, L2 and L3, by an energizing circuit which includes an impedance network denoted as a whole by N.

The secondary or rotor circuit of the motor includes resistors 1, 2 and 3 which can be short-circuited in sequential steps under control by the operator, preferably with the aid of a master controller (not illustrated).

The network N includes the primary windings 4, 5, 6 and 7 of four transformers R1, R2, R3 and R4. The secondary windings of these transformers are denoted by 8, 9, 10 and 11, respectively. The primary windings 4, 5, 6 and 7 are connected in series relation to one another so that they form the four branches of the bridge circuit.

The primary windings 4, 5, 6 and 7 serve as variable impedances, and their impedance magnitude is controlled by the appertaining secondary windings depending upon whether the secondary circuits have high or low impedance. When, for instance, the impedance values of the four primary transformer windings are equal so that the network N is balanced, a maximum degree of unbalance is imposed on the three-phase energization of the motor so that it is excited under approximate single-phase conditions. Under these conditions, the motor has no starting torque. When the impedance of the transformer primaries 4 and 6 is at a minimum while the primaries 5 and 7 have maximum impedance, the motor is approximately energized as if its terminal T1 were directly connected to the line terminal L1, and as if motor terminal T2 were substantially in direct connection with the line terminal L2. The phase rotation of the voltages impressed across the terminals T1—T2, T2—T3, T3—T1 is then of the same direction as the phase sequence of the multiphase voltage applied between the terminals L1—L2, L2—L3, L3—L1. Consequently, the motor will now develop torque at any speed, for instance, in the forward or hoisting direction. Conversely, if the impedance values of transformer windings 4 and 6 are high while those of windings 5 and 7 are low, the motor will be energized under conditions which approximate a direct connection of motor terminal T1, to line terminal L2 with a similar connection between motor terminal T2 and line terminal L1. The phase sequence of the voltages impressed across the motor terminals is then in opposition to that of the line voltage so that the motor develops three-phase torque in the opposite, i. e., the reverse or lowering direction. It will thus be seen that by controlling and progressively varying the impedance in the circuits of the secondary transformer windings, the motor can be caused to operate under different performance characteristics between the above-mentioned limit conditions.

In order to secure such a control, the secondary windings 8 and 10 are series connected with each other in the plate circuit of a discharge tube E1, for instance, of the gaseous type as known under the name thyratron. Similarly, the secondary transformer windings 9 and 11 are series connected in the plate circuit of another similar electronic tube denoted by E2. During the operation of the control system, the secondary voltages induced in the transformer windings 8 and 10 furnish the plate voltage for the tube E1; and similarly, the secondary voltages induced in transformer windings 9 and 11 furnish the plate excitation for the tube E2. The tubes E1 and E2 operate substantially in the sense of variable impedance devices whose effective impedance value can be varied by means of the appertaining grid or control circuits.

The grid 16 of tube E1 and the grid 17 of tube E2 are interconnected by a series arrangement of resistors 18, 19, 20 and 21. The resistance value of both resistors 18 and 19 equals that of both resistors 20 and 21 so that the point C denotes the electrical center relative to the voltage drop across the series-connected grid resistors.

Disposed between point C and the common cathode lead of the tubes is a tapped portion of a rheostat 22. This rheostat is impressed by a constant unidirectional voltage from a suitable voltage source, here represented by a rectifier 23 energized from an auxiliary transformer 24 whose primary may be connected across the line terminals L1 and L3. The voltage drop across the tapped portion of rheostat 22 imposes a constant grid bias on the tubes E1 and E2 which may be so polarized and rated as to have the tendency to maintain both tubes under maximum conductance conditions, so that the tubes fire with maximum firing angles. It is, however, also possible to operate under conditions where the grid bias from rheostat 22 is so polarized as to maintain the tubes E1 and E2 normally non-conductive; or the grid bias may have a value intermediate those just mentioned, for instance, so that the tubes tend to operate with a medium firing angle and have medium effective conductance.

Attached to the points A and B along the resistance arrangement is an auxiliary circuit 25 which includes two interconnected sources of control voltage. One of these sources consists of a pilot generator 26 which is mechanically connected to the armature of motor M as is schematically indicated by a broken line 27. The pilot generator 26 is of the tachometer type so that it provides a direct current voltage substantially proportional to the motor speed, and of a polarity determined by the running direction of motor. The second voltage source in circuit 25 is represented by a potentiometer rheostat 28 which is energized from a suitable source of direct current voltage, here shown as a rectifier 29 energized from a transformer 30 whose primary winding may also be connected across line terminals L1 and L3. The rheostat 28 has a number of taps of which one at a time is connected to point A of the above-mentioned resistor arrangement. The tap point of rheostat 28 can be selected by the operator, for instance, with the aid of the master controller (not shown) that also controls the above-mentioned resistors 1, 2 and 3 in the secondary motor circuit. The polarity of connection of pilot generator 26 and rheostat 28 is such that the adjusted constant voltage drop across the tapped portion of rheostat 28 opposes the variable voltage of the generator. When these two voltages are equal, only the above-mentioned constant grid bias from rheostat 22 is effective in the grid circuits of the control tubes. This is the case when the motor M runs at a singular speed whose value is determined by the selected setting of rheostat 28. When the motor speed differs from this value, a resultant finite voltage is impressed by circuit 25 across points A and B of the resistor circuit, and the polarity of this voltage depends on whether the motor speed is below or above the given value. Any such finite voltage is additive with respect to the bias voltage from rheostat 22 in the grid circuit of one of the tubes and subtractive to the bias voltage in the grid circuit of the other tube. Consequently, when the motor runs at a speed different from the above-mentioned one tube becomes more conductive and the other less conductive. That is, if thyratrons are used, the firing angle or interval of conductance of one tube is increased simultaneously with a decrease in the firing angle or conductive interval of the other tube. This causes a change in the loading of the two groups of secondary transformer windings with the result that the impedance distribution between coils 4, 5, 6 and 7 of the network N is changed. The voltage distribution across the motor terminals is changed in a corresponding degree so that the speed torque performance of the motor is controlled accordingly.

A specific way of applying the system to the control of a hoist motor under hoisting and lowering conditions will now be described in detail.

It is assumed that for these operations the bias voltage derived from the rheostat 22 is of such a value that the tubes E1 and E2 are both conductive with a medium firing angle so that the primary transformer windings of the network N have medium effective impedance. The impedance distribution of the network is then balanced and the motor receives approximate single-phase energization, so that the motor has substantially zero torque at zero speed as long as the bias voltage from rheostat 22 is alone effective on the grids of tubes E1 and E2.

For performing a lowering operation, the rheostat 28 is so adjusted that its tap point D1' is in connection with the point A of the tube grid circuit, as is illustrated in Fig. 1. With this adjustment the rheostat 28 lies outside the auxiliary circuit 25 and has no influence on the control performance. At zero speed of motor M, the component control voltage of the generator 26 is zero. Consequently, the circuit 25 does not impress a voltage across points A and B of the grid circuit, and the grid bias from rheostat 22 is alone effective. As mentioned above, the motor torque is then zero at zero speed. This condition corresponds to the point F1 in the speed torque diagram of Fig. 3.

If an overhauling load is effective on the motor M, this load will start rotating the motor in the lowering direction. As the motor speed increases, the generator 26 develops a correspondingly increasing voltage of the indicated polarity. The resultant voltage drop across the resistors between points A and B is in opposition to the constant grid bias from rheostat 22 in the grid circuit of tube E1 and is cumulative as regards the constant grid bias effective on tube E2. As a result the tube E1 is caused to operate with an increasing firing angle and conducts during correspondingly increasing intervals. Conversely, the tube E2 decreases its firing angle and assumes a lower effective conductance. Due to the decreased effective impedance of tube E1, the loading of the secondary transformer windings 8 and 10 increases, and the impedance of the appertaining primary windings 4 and 6 decreases. Simultaneously, and for analogous reasons, the effective impedance of primary windings 5 and 7 increases. In consequence, the voltage distribution across the motor terminals approaches progressively a balanced three-phase energization whose phase rotation is identical with that of the voltage effective across the line terminals L1, L2 and L3. With this phase rotation, the motor develops a hoisting torque which counteracts the downward torque of the overhauling load. This behavior of the motor corresponds in type to the counter-torque lowering characteristic D1 in Fig. 3.

If the system is adjusted to the second lowering position, the tap point D2' of rheostat 28 is in connection with point A, so that a relatively small voltage drop originating from the rectifier 29 is now effective between points D1' and D2' of rheostat 28. At zero speed of motor M, the component control voltage from the pilot generator 26 is zero so that then only the voltage drop D1'—D2' is impressed by circuit 25 across points A and B of the grid circuits proper. This voltage drop is additive to the constant grid bias from rheostat 22 with respect to tube E2 but subtractive with respect to the tube E1. The resultant grid bias on tube E1 is reduced and tube E1 becomes less conductive, while the tube E2, whose resultant grid bias is changed in the positive direction, conducts during longer intervals. As a result, the impedance of windings 4 and 6 is increased and the impedance of windings 5 and 7 is decreased. An unbalanced three-phase voltage is now applied to the motor terminals so that the phase sequence at these terminals is opposite to that of the line voltage across the terminals L1, L2 and L3. The motor is therefore caused to develop a drive-down torque at zero speed in accordance, for instance, with the point G2 of curve D2 shown in Fig. 3.

As the drive-down speed of the motor increases, the generator 26 provides an increasing voltage which opposes the voltage drop D1'—D2'. Thus, a condition will be reached where the voltage from the generator just balances the tapped-off voltage drop of rheostat 28. In that condition, the constant grid bias from rheostat 22 is alone effective, and the network has a balanced impedance distribution so that the motor is energized for zero torque. The speed at which this occurs is indicated by point F2 in Fig. 3. When the motor speed increases beyond the value F2, the motor torque is reversed so that the motor counteracts the lowering torque of the overhauling load. This occurs along the lower branch of the characteristic D2 beyond point F2.

When the point D3' of rheostat 28 (Fig. 1) is in connection with point A (third point lowering), the performance is similar to the one just described except that the lowering torque at zero speed is increased to the amount exemplified by point G3 in Fig. 3, and the reversal of the motor torque occurs at a higher lowering speed than before, as is represented by point F3 of the characteristic D3. It thus will be seen that the speed value at which the development of counter-torque commences is determined by the selected adjustment of the rheostat 28. It is assumed that during the above-described steps of lowering performance, the resistance in the secondary circuit of motor M remains unchanged, preferably so that the resistors 1, 2, and 3 (Fig. 1) are fully in operation for maximum resistance.

If it is desired to apply the control system of Fig. 1 for hoisting performance, the rheostat is so adjusted that, for instance, the point H2' is in connection with the point A. With this adjustment, a comparatively high voltage drop across points D1' and H2' of rheostat 28 is effective between points A and B, when the motor is at rest and the voltage of generator 26 is zero. This voltage impressed across points A and B from rheostat 29 has reversed polarity, as compared with the voltage drop derived from rheostat 28 during the above-described lowering operations. This high and reversed voltage is in opposition to the grid bias from rheostat 22 in the grid circuit of tube E1 and so preponderant as to increase the firing angle of tube E1 to a maximum. In analogy, the firing angle of tube E2 is now decreased to a minimum or zero. With this adjustment, the windings 4 and 6 in network N have minimum impedance while the windings 5 and 7 have maximum impedance. Consequently, a three-phase energization of minimum unbalance, i. e., approximately symmetrical phase distribution, is applied to the motor terminals in the same phase sequence as it exists at the line terminals L1, L2 and L3. Consequently, a large hoisting torque is developed at zero speed, for instance, in accordance with point K2 of the characteristic H2 shown in Fig. 3. As the hoist speed increases, the voltage from the generator 26 becomes increasingly effective. This voltage has now the reversed polarity indicated by (+) and (—). At a singular speed, this generator voltage balances the relatively high voltage drop across points D1' and H2' of rheostat 28 so that then the network N has a balanced impedance distribution and causes the energization of the motor to assume maximum unbalance. In other words, when this speed is reached the motor torque is zero. This condition is exemplified by point P2 on curve H2 in Fig. 2. When the motor speed increases beyond the speed value P2, the motor torque reverses and thus acts as counter-torque.

When the rheostat 28 is adjusted so that the point H3' (Fig. 1) is in connection with point A, the motor characteristic follows the conditions represented by curve H3 in Fig. 3. That is, a reduced starting torque K3 occurs at zero speed of the motor, and the speed value P3 at which the torque reverses is likewise reduced.

In Fig. 3, another hoisting characteristic is denoted by H1. This characteristic shows zero torque at 100% hoisting speed and corresponds, in type, to a speed-torque diagram obtained with a fully balanced three-phase energization. Such an energization can be obtained in the system of Fig. 1 by eliminating the network N from the energizing circuit and connecting line terminals L1 and L2 directly with motor terminals T1 and T2, respectively. The contact means for obtaining such a connection are not shown in Fig. 1 but may be similar to those represented in Fig. 2 by the contactor RC and described below.

While in the foregoing description of motor performances no reference is made to a variation in the adjustment of the secondary resistors 1, 2 and 3, it will be understood that the speed-torque characteristics can be further modified by also varying the resistance of these resistors between the maximum value and zero.

In the system according to Fig. 1, the control performance of each tube and associated transformer is effective during each second half wave. Such half-wave control is sufficient for some purposes. If desired, however, a full wave control can be obtained by adding to each tube a second tube in back-to-back connection. The grid circuits of such additional tubes may be designed in the same manner as the illustrated circuits of tubes E1 and E2. Another way of extending the control performance over both half waves of energization will be apparent from the embodiment described presently.

According to Fig. 2, the connections between the terminals T1, T2 and T3 of a wound rotor and the respective line terminals L1, L2 and L3 includes reversing contacts, which are shown schematically as forming part of a single reversing contactor RC, although it is understood that separate contactors or other reversing control means may be used instead. Interposed between motor terminals T1, T2 and line terminals L1, L2 is an impedance network N which is composed of four reactors S1, S2, S3 and S4. Each reactor has an impedance winding 104, 105, 106 or 107 and a control winding 108, 109, 110 or 111. The impedance value of the impedance windings is at a maximum when the appertaining control windings are deenergized and decreases with increasing excitation of the control winding. As is well known, the impedance winding of such a reactor has two sections whose inductive effects relative to the control winding are balanced so that the alternating current flowing through the impedance winding does not induce a voltage in the control winding. The connection of the impedance windings relative to one another and with respect to the motor terminals and line terminals, and also the connection of the control windings 108, 109, 110 and 111 relative to one another, is similar to the corresponding circuit connections shown in Fig. 1 and explained in the foregoing. When the reversing contactor is in the illustrated position, the impedance network is connected between the line terminals and motor terminals in the same manner as the impedance network N in Fig. 1. When the contactor RC is in the other position, the network N in Fig. 2 is disconnected from the energizing circuit and the line terminals L1 and L2 are directly connected with the respective motor terminals T1 and T2.

The control windings 108 and 110 are connected in the plate circuit of tube E1, and the control windings 109 and 111 are similarly connected to tube E2. The plate circuits of these two tubes are energized from the secondary 131 of a transformer TR whose primary winding 132 is connected to terminals L2 and L3. The grid 116 of tube E1 and the grid 117 of tube E2 are interconnected by series-connected resistors 118, 119, 120 and 121. A grid-voltage transformer 133 is disposed in the electrical center of the resistance arrangement and energized from the secondary winding 134 of transformer TR through a phase-shift network. The mid point C' of the secondary winding in transformer 133 is connected to a rheostat 122. This rheostat acts as a voltage divider and is energized by a rectifier 123 fed from another secondary winding 124 of transformer TR. The tapped portion of rheostat 122, provides a constant grid bias, for instance of such magnitude that it tends to maintain both tubes E1 and E2 in operation at a medium firing angle.

Connected across the points A and B in the grid circuits of tubes E1 and E2 is an auxiliary circuit 125, which includes in series, two rheostats 128 and 135. Rheostat 128 is impressed by direct current voltage from a rectifier 129 which is energized from a transformer winding 130. This rheostat corresponds to the rheostat 28 in Fig. 1 and permits adjusting the motor characteristics in the manner described in the foregoing with reference to Figs. 1 and 3.

The rheostat 135 is impressed by a variable direct current voltage substantially in accordance with the speed of the motor M from whose secondary circuit this voltage is derived in the following manner.

Connected to the three phases of the secondary motor circuit are three transformers 136, 137 and 138 in series with respective capacitors 139, 140 and 141. Connected to the secondaries of the transformers are respective rectifiers 142, 143 and 144. The output circuits of the rectifiers are connected in parallel to one another across the rheostat 135. A capacitor 145 may be provided for smoothing the rectified voltage. The transformers 136, 137 and 138 operate with a high degree of saturation so that the amplitude of their respective output voltages does not appreciably exceed a given value regardless of changes in amplitude of the input voltage. The capacitors 139, 140 and 141 serve as peaking devices. The resultant output voltage applied across the rheostat 135 is substantially proportional to the frequency of the voltage induced in the secondary motor circuit and hence of the motor speed. Thus these circuit connections perform a function similar to that of the pilot generator 26 in the embodiment of Fig. 1. When the network N is in operation in a system according to Fig. 2, the performance is largely similar to the lowering operations described in the foregoing with respect to Fig. 1. It should be noted, however, that the firing angle of the tubes E1 and E2 is controlled by a resultant grid voltage which includes an alternating current component derived from the transformer 133. Hence the effect of a voltage variation in the circuit 125 is a shift in the phase relation of the alternating grid voltage from transformer 133 relative to the plate voltage from transformer 131.

Connected across the reactor control windings 108 and 110 is a two-electrode valve or rectifier 146. A similar rectifier 147 lies across the reactor control windings 109 and 111.

These rectifiers consist preferably of gaseous discharge tubes. The polarity of their connections is such that they do not pass current when during the conductive intervals of the respective tubes E1 and E2. After the tube E1, for instance, has been conducting, the reverse current caused by the self-induction of windings 108 and 110 flows through the tube 146. Consequently, the interval of energization of windings 108 and 110 is extended beyond the actual interval of conductance of the tube E1 and may occupy a substantial portion of a full cycle. The tube 147 permits in the same manner the passage of reverse current from windings 108 and 110.

In Fig. 2, the operator-adjusted rheostat 128 is shown to have three selective tap points D1', D2' and D3' for performing lowering operations as typified by curves D1, D2, and D3 in Fig. 3. For hoisting operations, the contactor RC is reversed so that then the reactor control is disconnected, and a change in motor characteristic is then effected only by changing the effective resistance in the secondary motor circuit.

It will be understood by those skilled in the art that control systems according to the invention can be modified in various respects and especially in regard to the design of their individual components without departing from the above-described principles of the invention and within the scope of its essential features as set forth in the claims appended hereto.

We claim as our invention:

1. A motor control system, comprising a three-phase alternating-current motor, a three-phase circuit connected to said motor for supplying energization therefor, a group of controllable impedance devices each having an impedance winding and a control winding, said impedance windings being connected with one another and associated with two phases of said circuit so as to form an impedance network for controlling the phase distribution of said energization in dependence upon the impedance distribution in said network, two discharge tubes having respective plate circuits and respective control circuits, at least one of said control windings being connected in the plate circuit of one of said tubes, and at least one other control winding being connected in the plate circuit of said other tube so that said network is caused to vary its impedance distribution in one or the other sense depending upon a change in the ratio of conductance of said two tubes, said tube control circuits being interconnected so as to have a common branch, biasing means in said common branch for imposing a constant control bias on said tubes tending to maintain a given ratio of effective conductance of said tubes, an auxiliary circuit associated with the respective portions of said control circuits outside said common branch for imposing on said control circuits a control voltage that is additive in one control circuit and subtractive in the other relative to said bias, adjustable means disposed in said auxiliary circuit for providing a constant component control voltage of selective magnitude, condition responsive means associated with said motor for providing a variable component control voltage indicative of the motor speed, said condition-responsive means being connected with said auxiliary circuit so that said variable component voltage opposes said constant component voltage, whereby said motor assumes a given torque condition determined by said bias when the motor speed has a magnitude depending upon the selected setting of said adjustable means.

2. A motor control system, comprising a three-phase alternating-current motor, a three-phase circuit connected to said motor for supplying energization therefor, a group of controllable impedance devices each having an impedance winding and a control winding, said impedance windings being connected with one another and associated with two phases of said circuit so as to form an impedance network for controlling the phase distribution of said energization in dependence upon the impedance distribution in said network, two discharge tubes having respective plate circuits and respective control circuits, one of said control windings being connected in the plate circuit of one of said tubes, and another one of said control windings being connected in the plate circuit of said other tube so that said network is caused to vary its impedance distribution in one or the other sense depending upon the ratio of effective conductance of said two tubes, said control circuits having biasing means so rated as to cause, when alone effective, said tubes to maintain a relative ratio of effective conductance at which said impedance distribution is substantially balanced in order to energize the motor for minimum torque at zero speed, an auxiliary circuit associated with both said control circuits for imposing thereon a control voltage so that said control voltage is additive to said bias in one control circuit and subtractive to said bias in the other control circuit, adjustable means disposed in said auxiliary circuit for providing a constant component control voltage of selective magnitude, condition responsive means associated with said motor for providing a variable component control voltage indicative of the motor speed, said condition-responsive means being connected with said auxiliary circuit so that said variable component voltage opposes said constant component voltage, whereby said motor assumes minimum torque when the motor speed has a given value dependent upon the adjusted magnitude of said constant component control voltage.

3. A motor control system, comprising a three-phase alternating-current motor, a three-phase circuit connected to said motor for supplying energization therefor, a group of controllable impedance devices each having an impedance winding and a control winding, said impedance windings being connected with one another and associated with two phases of said circuit so as to form an impedance network for controlling the phase distribution of said energization in accordance with the impedance distribution in said network, two discharge tubes having respective plate circuits and respective control circuits, one of said control windings being connected in the plate circuit of one of said tubes, and another control winding being connected in the plate circuit of said other tube so that said network is caused to vary its impedance distribution in one or the other sense depending upon a change in the ratio of effective conductance of said two tubes, said tube control circuits being interconnected so as to have a common branch, biasing means in said common branch for imposing a constant control bias on said tubes tending to maintain said impedance distribution substantially balanced in order to energize said motor for zero torque at substantially zero speed, an auxiliary circuit associated with the respective portions of said control circuits outside said common branch for imposing on said control circuits a control voltage that is additive in one control circuit and subtractive in the other relative to said bias, adjustable means disposed in said auxiliary circuit for providing a constant component control voltage of selective magnitude, condition responsive means associated with said motor for providing a variable component control voltage indicative of the motor speed, said condition-responsive means being connected with said auxiliary circuit so that said variable component voltage opposes said constant component voltage, whereby said motor reverses its torque when its speed passes through a value predetermined by the selected setting of said adjustable means.

4. A motor control system comprising a three-phase alternating-current motor, a three-phase circuit connected to said motor for supplying energization therefor, a group of controllable impedance devices each having an impedance winding and a control winding, said impedance windings being connected with one another and associated with two phases of said circuit so as to form an impedance network for controlling the phase distribution of said energization in accordance with the impedance distribution in said network, two discharge tubes having respective plate circuits and respective control circuits, at least one of said control windings being connected in the plate circuit of one of said tubes, and at least one other control winding being connected in the plate circuit of said other tube so that said network is caused to vary its impedance distribution in one or the other sense depending upon a change in the ratio of conductance of said two tubes, said control circuits having biasing means so rated as to cause, when alone effective, said tubes to maintain a relative ratio of effective conductance at which said impedance distribution is substantially balanced in order to energize the motor for minimum torque at zero speed, an auxiliary circuit associated with both said control circuits for imposing thereon a control voltage additive to said bias in one control circuit and subtractive to said bias in the other control circuit, means disposed in said auxiliary circuit for providing a reference voltage as a component of said control voltage, condition-responsive means associated with said motor for providing a variable component control voltage indicative of the motor speed, said condition-responsive means being connected with said auxiliary circuit so that said variable component voltage opposes said reference voltage, an adjusting device associated with said auxiliary circuit for selectively adjusting the difference between said reference voltage and said variable voltage, whereby said motor assumes a given torque condition when the motor speed has a value predetermined by the selected setting of said adjusting device.

5. A motor control system, comprising a three-phase alternating-current motor having three terminals, three line terminals for supplying three-phase energization for said motor, one of said terminals being connected with one of said motor terminals, an impedance-network of the balanceable type having input points connected to said other two line terminals and having output points connected to said other two line terminals so that the phase distribution of said energization across said motor terminals depends upon the impedance distribution in said network, two transformers having respective primary windings disposed in said network at opposite sides of one of said output points so that said impedance distribution depends upon the impedance ratio of said windings, two controllable electronic tubes connected to said respective secondary windings to be energized by voltages from said respective secondary windings, said tubes having two respective control circuits provided with biasing means for imposing on said tubes a constant bias which tends to maintain said tubes at medium conductance conditions, an auxiliary circuit associated with both said control circuits for imposing thereon a control voltage so that said control voltage is additive to said bias in one control circuit and subtractive to said bias in the other control circuit, means disposed in said auxiliary circuit for providing a reference voltage as a component of said control voltage, condition responsive means associated with said motor for providing a variable component control voltage indicative of the motor speed, said condition-responsive means being connected with said auxiliary circuit so that said variable component voltage opposes said reference voltage, an adjusting device associated with said auxiliary circuit for selectively adjusting the difference between said reference voltage and said variable voltage, whereby said motor assumes a given torque condition when the motor speed has a value predetermined by the selected setting of said adjusting device.

6. A motor control system, comprising a three-phase alternating-current motor having three terminals, three line terminals for supplying three-phase energization for said motor, one of said terminals being connected with one of said motor terminals, four transformers having respective primary windings and respective secondary windings, said primary windings being interconnected to form four respective branches of a bridge network input-connected to said other two line terminals and output-connected to said other two motor terminals, two electronic tubes having respective plate circuits and respective grid circuits, two of said secondary windings appertaining to the primary windings of two diagonally opposite branches of said network being connected in one of said plate circuits while said two other secondary windings are connected in said other plate circuit so that said tubes are energized by induced voltages from said respective pairs of secondary windings, said grid circuits having a common branch provided with means for imposing a constant grid bias on said tubes and containing respective resistors outside said common branch, an auxiliary circuit attached to said resistors for imposing a control voltage on said control circuits which is additive to said bias in one control circuit and subtractive in the other, a source of a reference voltage disposed in said auxiliary circuit, and a speed-measuring voltage source disposed in said auxiliary circuit in opposition to said source of reference voltage and associated with said motor so that said control voltage is proportional to the difference of said reference voltage and a speed-measuring voltage.

7. A motor control system, comprising a multiphase alternating-current motor, a multiphase circuit for supplying energization for said motor, control means asymmetrically associated with said circuit for varying the multiphase distribution of said energization in order to thereby control the speed-torque characteristic of said motor, said control means including a saturable reactor having an alternating-current winding connected in said circuit and having a direct-current control winding for controlling the impedance of said alternating-current winding, alternating-current supply means connected to said control winding, a controllable electronic tube series-connected between said supply means and said control winding for energizing said control winding by half-wave rectified current from said supply means, a two-electrode valve means connected across said control winding to permit the flow of self-inductance current from said control winding in the non-conductive intervals of said tube, said tube having a grid circuit for controlling said rectified current, and voltage supply means connected with said grid circuit and controlled by said motor for imposing on said grid circuit a voltage variable in dependence upon the motor speed.

8. A motor control system, comprising a three-phase alternating-current motor having three terminals, three line terminals for supplying three-phase energization for said motor, one of said terminals being connected with one of said motor terminals, four saturable reactors having respective alternating-current windings and respective control windings for varying the impedance value of said alternating-current windings, said alternating-current windings being interconnected to form four respective branches of a bridge network input-connected to said other two line terminals and output-connected to said other two motor terminals, two electronic tubes having respective plate circuits and respective grid circuits, two of said control windings appertaining to the alternating-current windings of two diagonally opposite branches of said network being connected in one of said plate circuits while said two other secondary windings are connected in said other plate circuit, said plate circuits being provided with alternating-current supply means, two two-electrode valves connected across said respective pairs of control windings with such polarity of connection as to conduct self-inductance current from the appertaining pair of control windings during the non-conductive intervals of said tubes, said grid circuits having a common branch provided with means for imposing a constant grid bias on said tubes and containing respective resistors outside said common branch, an auxiliary circuit attached to said resistors for imposing a control voltage on said control circuits which is additive to said bias in one control circuit and subtractive in the other, a source of a reference voltage disposed in said auxiliary circuit, and a speed-measuring voltage source disposed in said auxiliary circuit in opposition to said source of reference voltage and associated with said motor so that said control voltage is proportional to the difference of said reference voltage and a speed-measuring voltage.

9. A motor control system, comprising a multiphase alternating-current motor having terminals, a multiphase energizing circuit connected to said terminals for supplying energization to said motor, an impedance network forming part of said energizing circuit and including two saturable reactors each having a control winding for controlling the impedance of said reactors in order to thereby vary the phase distribution of said energization, alternating-current means, two controllable electronic tubes disposed between said alternating-current means and said respective control windings for exciting said control windings by half-wave rectified current from said alternating-current means, two two-electrode valves connected across said respective control windings with such polarity of connection as to permit the flow of self-induction current from said control windings in the non-conductive intervals of said respective tubes, said tubes having respective grid control circuits, a first voltage source having adjusting means for providing a constant control voltage of selective magnitude, a second voltage source associated with said motor for providing a control voltage whose magnitude varies in dependence upon the motor speed, said two voltage sources being interconnected in opposing relation to each other, and said two control circuits being connected in funcitonally inverse relation as regards each other with said interconnected voltage sources so that a change of said variable control voltage causes said tubes to change their respective conductance conditions in mutually opposite senses.

WILLIAM R. WICKERHAM.
CURT M. AVERY.

REFERENCES CITED

The following references are of record in the file of this patent:

UNITED STATES PATENTS

| Number | Name | Date |
|---|---|---|
| 1,376,453 | Meyer | May 3, 1921 |
| 1,849,646 | Stoller | Mar. 15, 1932 |
| 2,228,078 | Gulliksen | Jan. 7, 1941 |
| 2,287,459 | Uehling | June 23, 1942 |
| 2,411,608 | Lesnick | Nov. 26, 1946 |
| 2,440,319 | Wickerham | Apr. 27, 1948 |